(12) United States Patent
Wang et al.

(10) Patent No.: US 9,652,991 B2
(45) Date of Patent: May 16, 2017

(54) SYSTEMS AND METHODS FOR CONTENT SCORING OF SPOKEN RESPONSES (71) Applicant: Educational Testing Service, Princeton, NJ (US)

(72) Inventors: Xinhao Wang, Lawrenceville, NJ (US); Klaus Zechner, Princeton, NJ (US); Shasha Xie, Sunnyvale, CA (US)

(73) Assignee: Educational Testing Service, Princeton, NJ (US)

( * ) Notice: Subject to any disclaimer, the term of this patent is extended or adjusted under 35 U.S.C. 154(b) by 274 days.

(21) Appl. No.: 14/198,704

(22) Filed: Mar. 6, 2014

(65) Prior Publication Data

US 2014/0255886 A1    Sep. 11, 2014

Related U.S. Application Data

(60) Provisional application No. 61/774,648, filed on Mar. 8, 2013, provisional application No. 61/803,158, filed on Mar. 19, 2013.

(51) Int. Cl.
*G09B 5/00* (2006.01)

(52) U.S. Cl.
CPC ...................... *G09B 5/00* (2013.01)

(58) Field of Classification Search
USPC ........................ 434/156, 157, 169
See application file for complete search history.

(56) References Cited

U.S. PATENT DOCUMENTS 6,157,913 A * 12/2000 Bernstein ................ G10L 17/26
 434/169
8,128,406 B2 * 3/2012 Wood ................... G09B 17/006
 434/156

OTHER PUBLICATIONS

Alwan, Abeer, Bai, Yijian, Black, Matt, Casey, Larry, Gerosa, Matteo, Heritage, Margaret, Iseli, Markus, Jones, Barbara, Kazemzadeh, Abe, Lee, Sungbok, Narayanan, Shrikanth, Price, Patti, Tepperman, Joseph, Wang, Shizhen; A System for Technology Based Assessment of Language and Literacy in Young Children: the Role of Multiple Information Sources; Proceedings of IEEE International Workshop on Multimedia Signal Processing; 2007.

(Continued)

*Primary Examiner* — Kesha Frisby
(74) *Attorney, Agent, or Firm* — Jones Day (57) ABSTRACT

Computer-implemented systems and methods are provided for automatically scoring the content of moderately predictable responses. For example, a computer performing the content scoring analysis can receive a response (either in text or spoken form) to a prompt. The computer can determine the content correctness of the response by analyzing one or more content features. One of the content features is analyzed by applying one or more regular expressions, determined based on training responses associated with the prompt. Another content feature is analyzed by applying one or more context free grammars, determined based on training responses associated with the prompt. Another content feature is analyzed by applying a keyword list, determined based on the test prompt eliciting the response and/or stimulus material. Another content feature is analyzed by applying one or more probabilistic n-gram models, determined based on training responses associated with the prompt. Another content feature is analyzed by comparing a POS response vector, determined based on the response, to one or more POS training vectors, determined based on training responses associated with the prompt. Another content feature is analyzed by comparing a response n-gram count to one or more training n-gram counts using an n-gram matching evaluation metric (e.g., BLEU). Another content feature is analyzed by comparing the response to one to training responses associated with the prompt using a dissimilarity metric (e.g., edit distance and word error rate).

21 Claims, 11 Drawing Sheets

(56) References Cited

OTHER PUBLICATIONS

Burstein, Jill, Kukich, Karen, Wolff, Susanne, Lu, Chi, Chodorow, Martin, Braden-Harder, Lisa, Harris, Mary Dee; Automated Scoring Using a Hybrid Feature Identification Technique; International Conference on Computational Linguistics; pp. 206-210; 1998.

Eskenazi, Maxine; An Overview of Spoken Language Technology for Education; Speech Communication, 51; pp. 832-844; 2009.

Foltz, Peter, Laham, Darrell, Landauer, Thomas; The Intelligent Essay Assessor: Applications to Educational Technology; Interactive Multimedia Education Journal of Computer-Enhanced Learning, 1(2); 1999.

Franco, Horacio, Bratt, Harry, Rossier, Romain, Rao Gadde, Venkata, Shriberg, Elizabeth, Abrash, Victor, Precoda, Kristin; EduSpeak: A Speech Recognition and Pronunciation Scoring Toolkit for Computer-Aided Language Learning Applications; Language Testing, 27(3); pp. 401-418; 2010.

Kanejiya, Dharmendra, Kumar, Arun, Prasad, Surendra; Automatic Evaluation of Students' Answers Using Syntactically Enhanced LSA; Workshop on Building Educational Applications Using Natural Language Processing; pp. 53-60; 2003.

Mitchell, Tom, Russell, Terry, Broomhead, Peter, Aldridge, Nicola; Towards Robust Computerised Marking of Free-Text Responses; International Computer Assisted Assessment Conference; 2002.

Mohler, Michael, Mihalcea, Rada; Text-to-text Semantic Similarity for Automatic Short Answer Grading; European Chapter of the Association for Computational Linguistics; 2009.

Papineni, Kishore, Roukos, Salim, Ward, Todd, Zhu, Wei-Jing; Bleu: A Method for Automatic Evaluation of Machine Translation; Proceedings of the 40th Annual Meeting of the Association for Computational Linguistics; pp. 311-318; 2002.

Sukkarieh, Jana, Blackmore, John; c-rater: Automatic Content Scoring for Short Constructed Responses; Proceedings of the 22nd International FLAIRS Conference; pp. 290-295; 2009.

Xie, Shasha, Evanini, Keelan, Zechner, Klaus; Exploring Content Features for Automated Speech Scoring; Conference of the North American Chapter of the Association for Computational Linguistics: Human Technologies; pp. 103-111; 2012.

\* cited by examiner

SYSTEMS AND METHODS FOR CONTENT SCORING OF SPOKEN RESPONSES

Applicant claims benefit pursuant to 35 U.S.C. §119 and hereby incorporates by reference the following U.S. Provisional patent applications in their entirety: "Automated Content Scoring of Spoken Responses in an Assessment for Teachers of English," App. No. 61/774,648, filed Mar. 8, 2013; and "Method of Content Evaluation for Automated Scoring of Medium-Entropy Spontaneous Responses," App. No. 61/803,158, filed Mar. 19, 2013.

FIELD

The technology described herein relates generally to language analysis and more specifically to automated scoring of a test response.

BACKGROUND

Assessment of a response's content correctness is often performed in education and in other domains. Such a situation may occur, for example, where a language proficiency test is administered to aspiring teachers who are non-native English speakers. The spoken responses elicited by the test prompts may have varying degrees of predictability. For example, on the highly-predictable end of the spectrum the examinee may be asked to read a passage aloud, and on the other end of the spectrum the examinee may be asked to provide an open-ended spontaneous response, such as stating an opinion on an issue. In between these extremes are moderately predictable responses that are typically shorter and more constrained by the context of the item stimuli and test prompts as compared to an open-ended response (e.g., the examinee may be asked to instruct a class of students to open their text books to page 55). These types of moderately predictable responses are typically scored manually, which is often costly, time-consuming, and lacks objectivity. The problem is further exacerbated where the number of responses that need to be scored is large.

SUMMARY

In accordance with the teachings herein, computer-implemented systems and methods are provided for automatically scoring the content of moderately predictable responses. For example, a computer performing the content scoring analysis can receive a response (either in text or spoken form) to a prompt. The computer can determine the content correctness of the response by analyzing one or more content features. One of the content features is analyzed by applying one or more regular expressions, determined based on training responses associated with the prompt. Another content feature is analyzed by applying one or more context free grammars, determined based on training responses associated with the prompt. Another content feature is analyzed by applying a keyword list, determined based on the test prompt eliciting the response and/or stimulus material. Another content feature is analyzed by applying one or more probabilistic n-gram models, determined based on training responses associated with the prompt. Another content feature is analyzed by comparing a POS response vector, determined based on the response, to one or more POS training vectors, determined based on training responses associated with the prompt. Another content feature is analyzed by comparing a response n-gram count to one or more training n-gram counts using an n-gram matching evaluation metric (e.g., BLEU). Another content feature is analyzed by comparing the response to one to training responses associated with the prompt using a dissimilarity metric (e.g., edit distance and word error rate).

DETAILED DESCRIPTION

Figure 1:
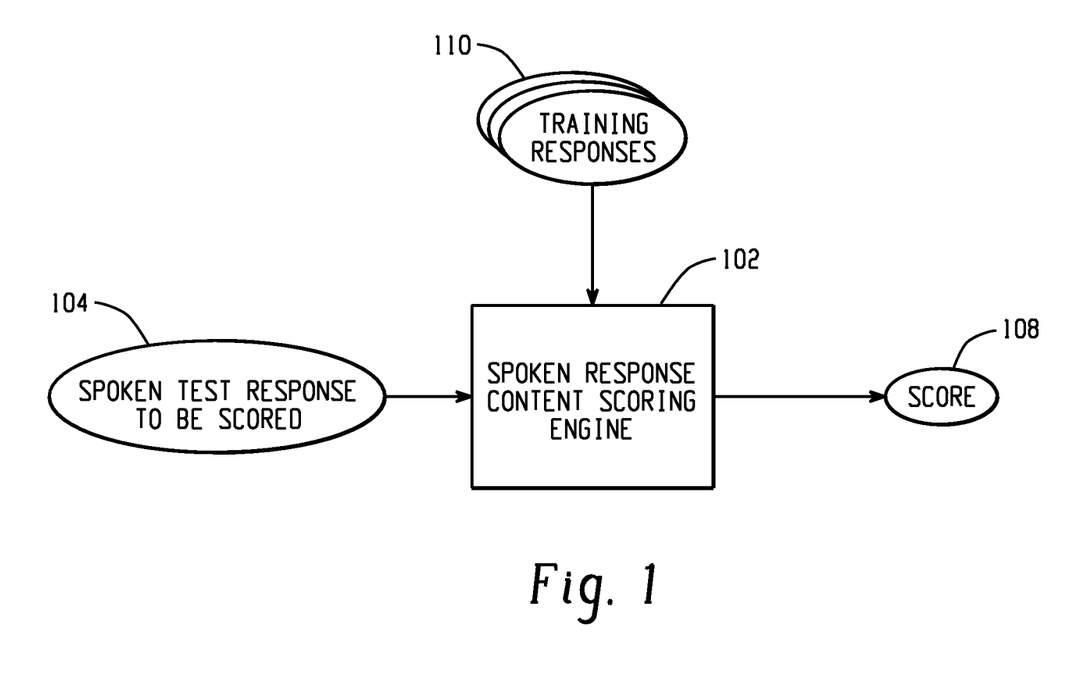
FIG. 1 depicts a computer-implemented environment for scoring a response.

FIG. 1 is a high-level diagram depicting one embodiment of a computer-implemented environment for scoring a response. The spoken response content scoring engine 102 is designed to evaluate the content correctness of a response (e.g., the response to a test prompt). It may be implemented by software, hardware, or any other conventional means known in the art. The content scoring engine 102 receives a spoken response to be scored 104, which may range in predictability as discussed above and may be in any format (e.g., analog or digital). The spoken response 104 in one embodiment is converted into text using an automatic speech recognition system (ASR). To increase the robustness of the metrics, a pre-process stage may be introduced to remove all the disfluencies from the ASR output, such as filler words, recognized partial words, and repeated words. In one embodiment, the response received could also be text, and a similar pre-processing step for removing disfluencies may be utilized.

For a response 104 that is moderately predictable, the content scoring engine 102 can assign a score 108 measuring the content correctness of the response 104 by analyzing training responses 110. In one embodiment, the training responses 110 are sample responses to the same or similar test prompt that elicited the spoken response 104. Moreover, the training responses 110 have known proficiency scores, which may have been manually determined by human scorers. As an illustration of different levels of proficiency, suppose a test taker (e.g., English language teacher) is asked to request the class to open their text books on page 55. A high-scoring response (e.g., a score of 3) may include responses such as: "Please open your text books on page 55," or "Please open your text books and turn to page 55." A medium-scoring response (e.g., a score of 2) may include: "Please open the books on the page 55." A low-scoring response (e.g., a score of 1) may include: "Open book page 55."

Figure 2:
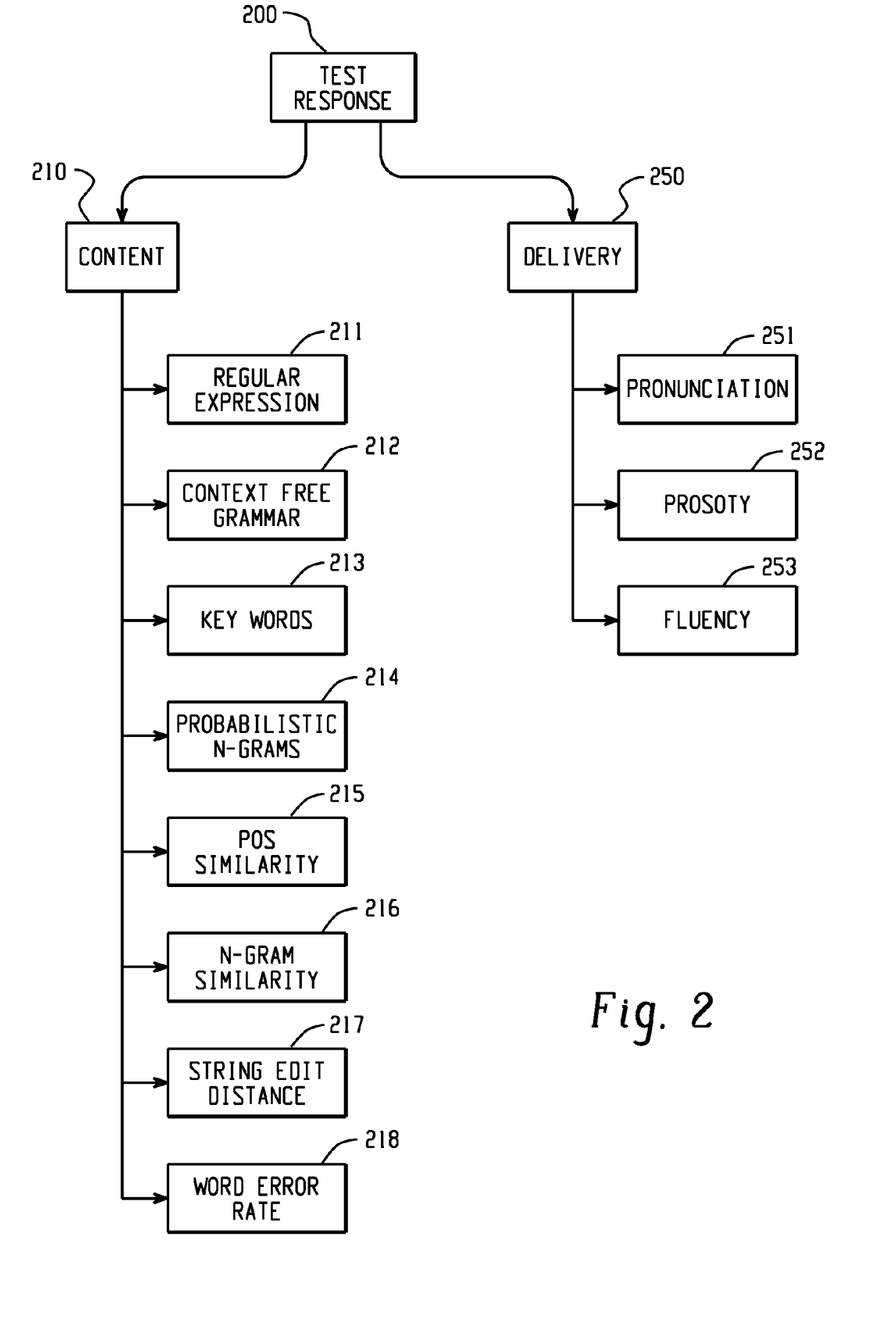
FIG. 2 depicts exemplary features used for scoring a response.

FIG. 2 depicts several feature extraction models for extracting and analyzing features of a test response. A test response 200, which in one embodiment may be a spoken response, can be scored based on construct aspects such as content 210 and delivery 250. Content 210 can be measured based on various content features, which can be extracted and analyzed using one or a combination of the following non-exhaustive feature extraction models: regular expression 211, context free grammar 212, keywords 213, probabilistic n-gram models 214, part-of-speech (POS) similarity 215, n-gram similarity 216, string edit distance 217, and word error rate 218. The aforementioned feature extraction models can generally be classified into three categories: (1) regular expressions 211, context free grammars 212, and keywords 213 can be used to measure narrow ranges of expressions with minor variations; (2) probabilistic n-gram models 214, POS similarity metrics 215, and n-gram similarity metrics 216 can be used to measure the similarity of word usage between the test response and training responses; and (3) string edit distance 217 and word error rate 218 can be used to measure the differences between the test response and training responses. The details of each of these feature extraction models are discussed below. The test response's 200 delivery construct can be measured based on any combination of its pronunciation 251, prosody 252, fluency 253, and other features of spoken delivery known in the art. Any combination of the aforementioned content and delivery features can then be used by a scoring model to determine a score for the test response 200.

Since many moderately predictable responses are expected to follow certain patterns, a test response can be matched against pre-built formal language grammars—such as regular expression and context free grammar—defined based on training responses with high proficiency scores. For example, a regular expression matching value, re_match, can be defined based on whether the test response matches any of the pre-built regular expressions. The re_match feature can obtain, for example, the value of 0 (no match), 1 (partial match), and 2 (exact match). Here, a partial match indicates that a regular expression can be matched within a test response that also has other spoken material, which is useful when the speaker repeats or corrects the answer multiple times in a single item response.

Figure 3:
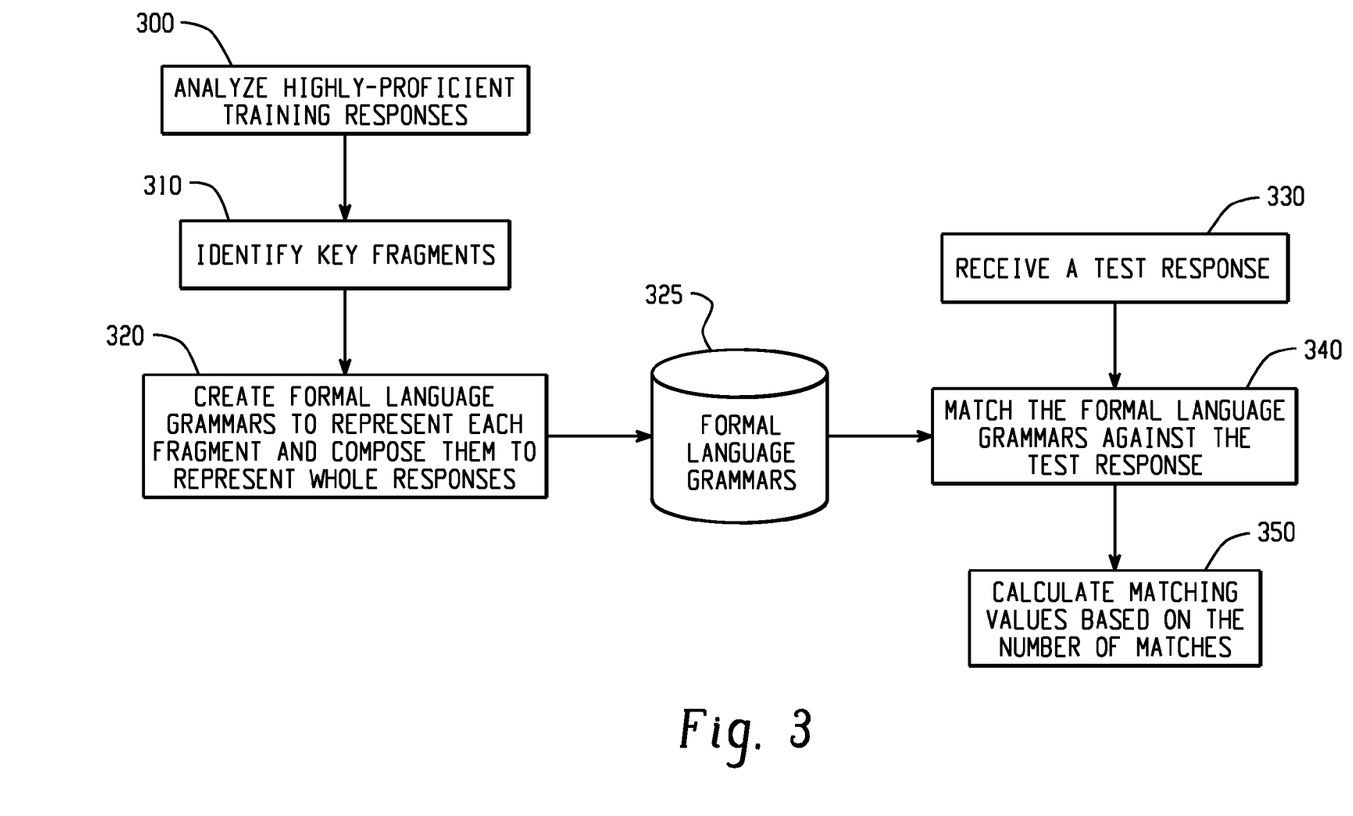
FIG. 3 is a flow diagram depicting a method of using formal languages to analyze a response.

To further improve the robustness of using formal language (e.g., regular expression and context free grammar) as a feature extraction model, FIG. 3 depicts one embodiment using formal language to model a gold-standard response's key fragments. At 300, training responses with high proficiency scores are analyzed. At 310, key fragments of the highly-proficient training responses are identified. For example, when looking at the training response, "Please open your text books and turn to page 55," two key fragments can be extracted: "Please open your text books" and "turn to page 55." Formal language grammars are then created for each key fragment and composed to represent whole responses at 320. At 325, the formal language grammars are stored in a repository (e.g., database, hard drive storage, RAM).

Once created, the formal language grammars can be used to extract and evaluate features of test responses. At 330, a test response is received or retrieved. At 340, the formal language grammars are matched against the received test response. At 350, a matching value is calculated based on the number of formal language grammars matching the response. This matching value will be referred to as num_fragments.

Figure 4:
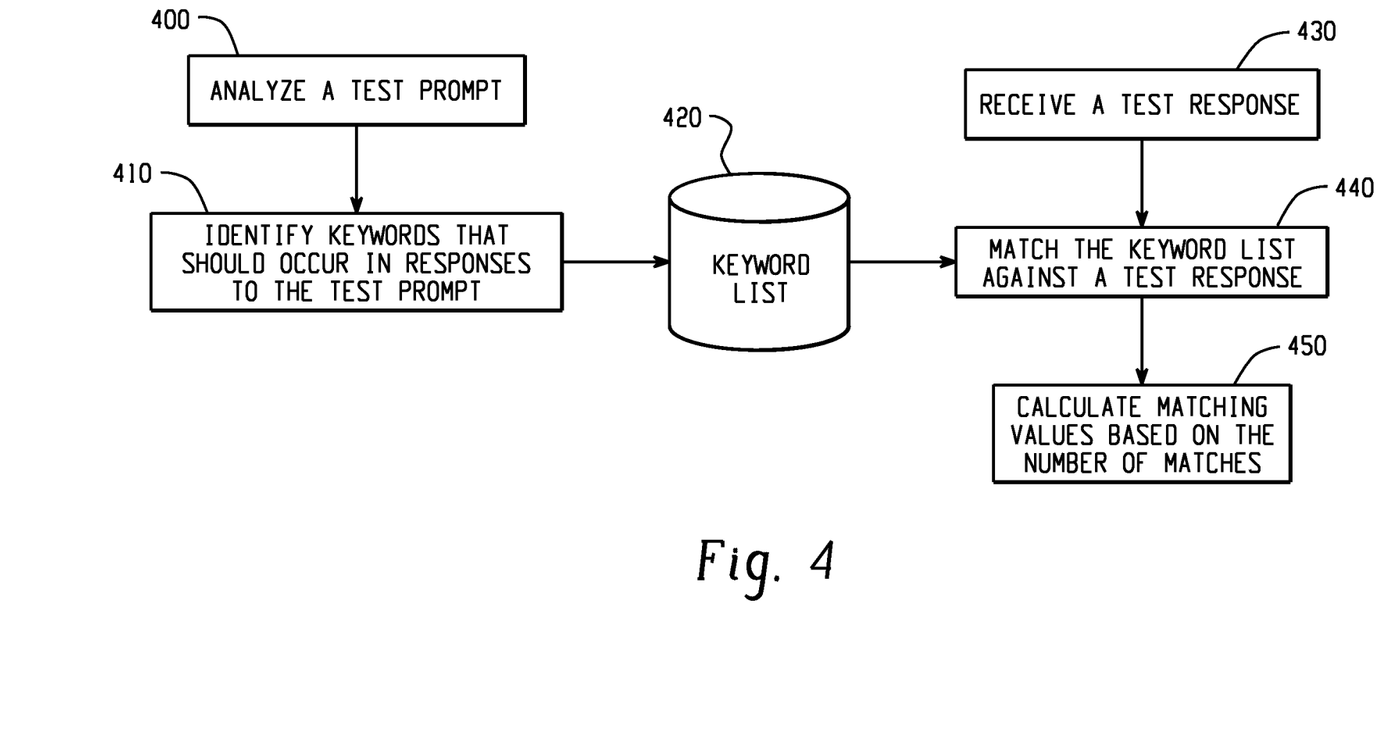
FIG. 4 is a flow diagram depicting a method of using keywords to analyze a response.

FIG. 4 depicts an embodiment using keyword matching to evaluate the content correctness of a response. At 400, a test prompt and/or its associated stimulus material are analyzed. Based on the analysis, keywords that ought to appear in a test response are identified at 410. At 420, the keyword list is saved in a repository for subsequent use. At 430, a test response is received or retrieved. At 440, the keyword list is matched against the words in the test response. At 450, a matching value is calculated based on the number of keyword matches. In one embodiment, the matching value is the total number of matches, which will be referred to as num_keywords. In another embodiment, the number of matching keywords can further be normalized by the number of keywords in the keyword list. This normalized matching value will be referred to as percent_keywords. In addition, as some keywords may be a phrase with multiple words (e.g., "text book"), such phrases can be split into single word keywords and form a sub-keyword list. The sub-keyword list can similarly be matched against the test response and the resulting feature values will be referred to as num_sub_keywords and percent_sub_keywords.

Figure 5:
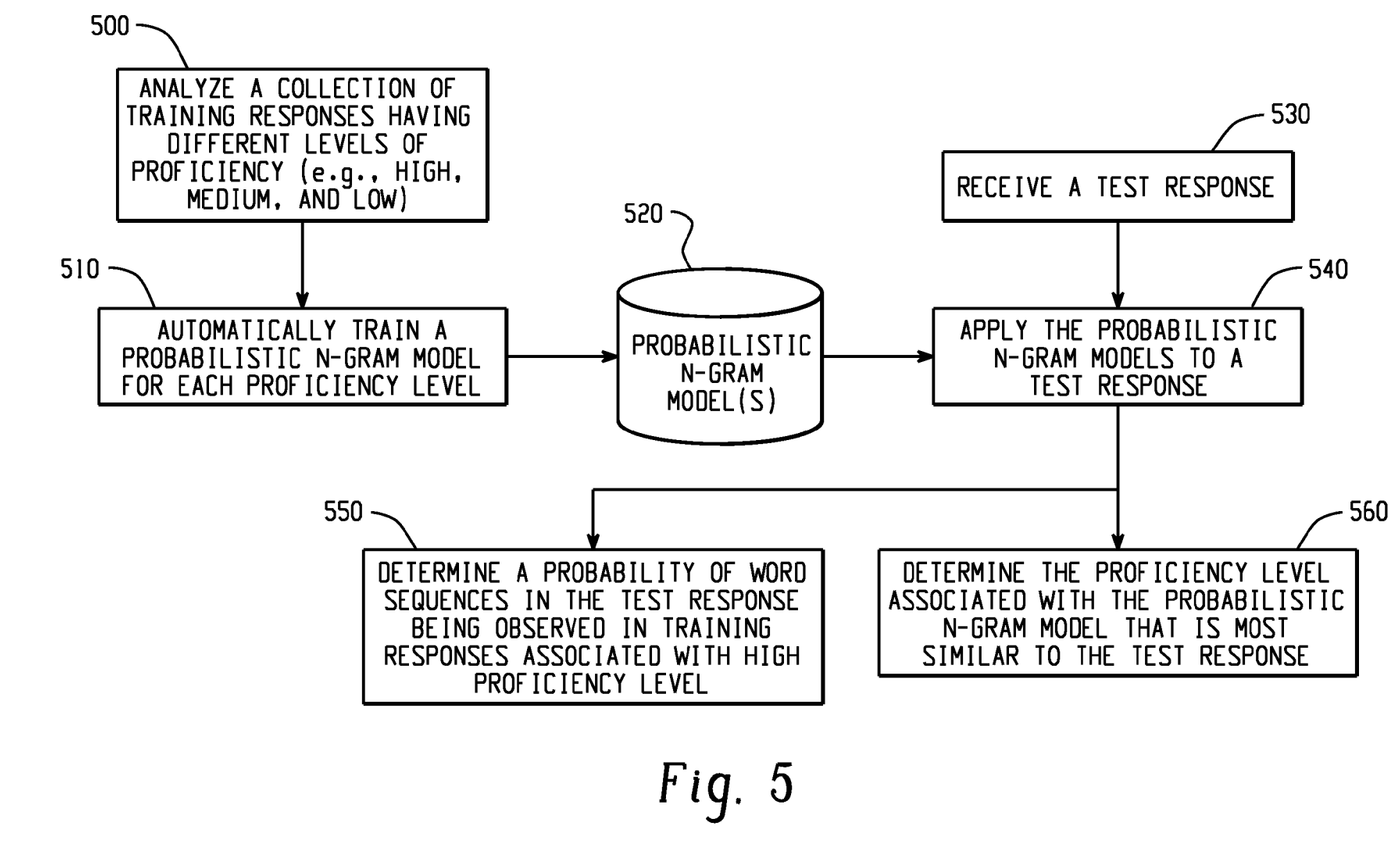
FIG. 5 is a flow diagram depicting a method of using probabilistic n-gram models to analyze a response.

FIG. 5 depicts an embodiment using a probabilistic n-gram model, which can provide a probability indicating how likely the word sequence of a test response can be observed in the training responses. At 500, a collection of training responses with varying degrees of proficiency level is analyzed. For example, the training responses may be associated with one of three proficiency-level groups: a high-proficient group, a medium-proficient group, and a low-proficient group. At 510, a probabilistic n-gram model is trained for each proficiency level using the training responses in that proficiency level. For ease of reference, the model associated with the high proficiency level will be referred to as high-proficient probabilistic n-gram model, the model associated with the medium proficiency level will be referred to as medium-proficient probabilistic n-gram model, and so forth. At 520, the resulting probabilistic n-gram models are then stored in a repository for subsequent use.

Then at 530, a test response is received or retrieved. At 540, one or more of the probabilistic n-gram models are applied to the test response, thereby deriving one or more corresponding probability values. The probability values resulting from applying the high-proficient, medium-proficient, and low-proficient probabilistic n-gram models will be referred to as lm_3, lm_2, and lm_1, respectively. At 550, the probability value corresponding to the high-proficient probabilistic n-gram model (i.e., lm_3) is used to measure the content correctness of the test response. For example, a high probability value means that the test response is similar to the highly proficient training responses and therefore should similarly be afforded a high proficiency level. Conversely, a low probability value means that the test response is not similar to the highly proficient training responses, and therefore the test response should be afforded a low proficiency level.

At 560, the probability values (e.g., lm_3, lm_2, and lm_1) are compared and the proficiency level associated with the highest probability value is used as one measure of the content correctness of the test response. Conceptually, this means that the test response should be assigned the proficiency level associated with the training responses that are most similar to it. For example, if lm_1>lm_2>lm_3, then lm_1's associated proficiency level (i.e., proficiency level 1 or low proficiency) may be a suitable proficiency level for the test response. The proficiency level associated with the highest probability value will be referred to as lm_score.

Figure 6:
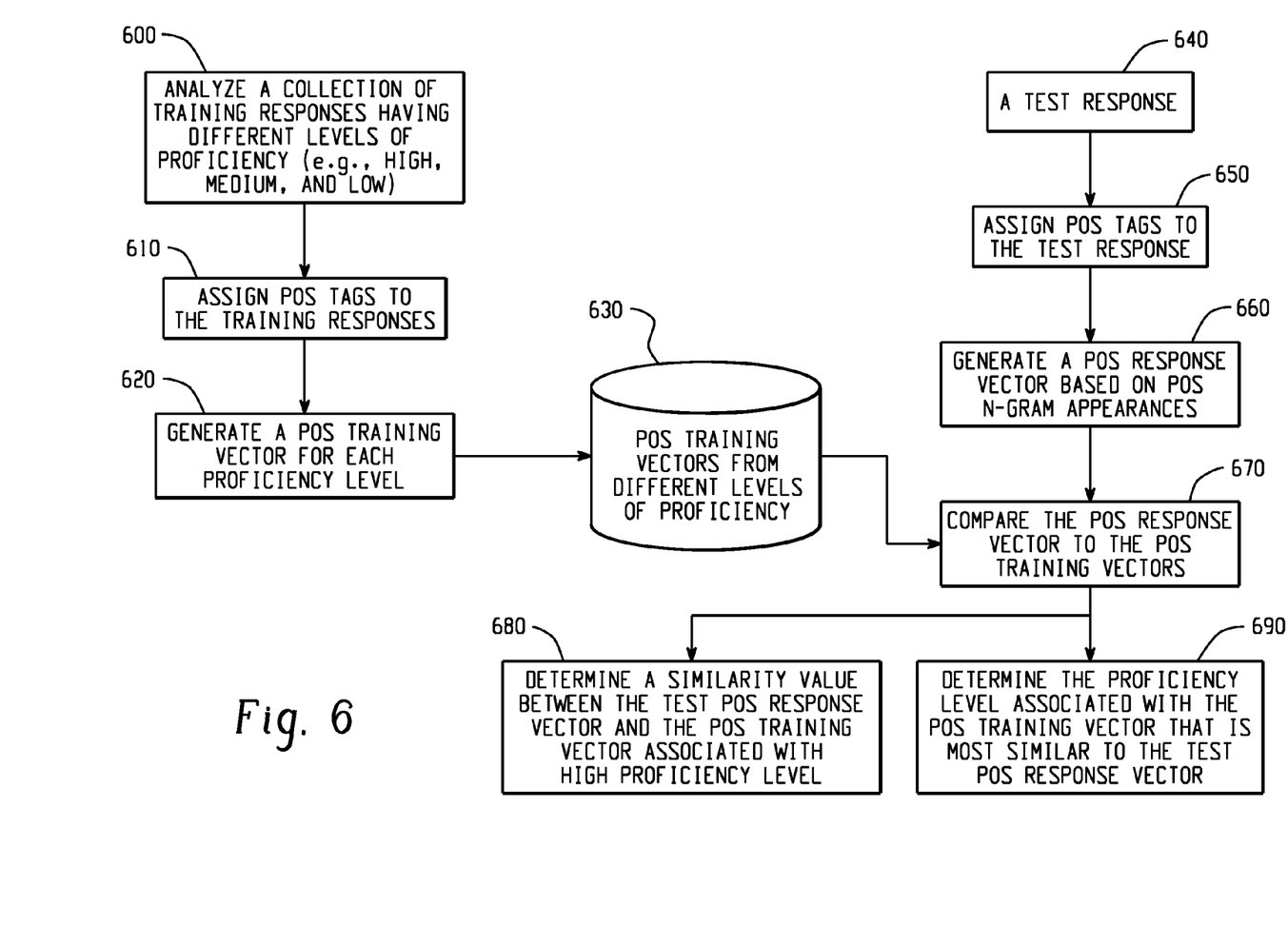
FIG. 6 is a flow diagram depicting a method of using POS (Part-of-Speech) tags to analyze a response.

FIG. 6 depicts an embodiment using part-of-speech (POS) tags—which, for example, identify words as nouns, verbs, adjectives, or adverbs—and their distribution to measure the syntactic complexity of a test response. At 600, a set of training responses with varying degrees of proficiency scores is analyzed. At 610, all the training responses are assigned POS tags by an automatic POS tagger. Then at 620, a POS training vector is generated for each proficiency level by counting POS n-grams (e.g., unigram, bigram, and trigram) appearing in the training responses associated with that proficiency level. For ease of reference, the POS training vector generated from the high-proficient training responses will be referred to as high-proficient POS training vector, the training vector generated from the medium-proficiency training responses will be referred to as medium-proficient POS training vector, and so forth. At 630, the generated POS training vectors then stored in a repository for subsequent use.

At 640, a test response is received or retrieved. At 650, the automatic POS tagger assigns POS tags to the test response. At 660, a POS response vector is generated based on POS n-gram appearances in the test response. At 670, the POS response vector is compared with the POS training vector of each proficiency level. In one embodiment, the comparison involves calculating the cosine similarity between the vectors. The resulting similarity scores for the high-proficient POS training vector will be referred to as pos_3; the similarity score for the medium-proficient POS training vector will be referred to as pos_2; and the similarity score for the low-proficient POS training vector will be referred to as pos_1.

At 680, the similarity score between the POS response vector and the high-proficient POS training vector (i.e., pos_3) is used as one measure of the content correctness of the test response. For example, a high similarity score means that the test response's syntactic complexity is similar to that of the highly proficient training responses, and therefore the test response should similarly be considered to be highly proficient. Conversely, a low similarity score would mean that the test response's syntactic complexity is not similar to that of the highly proficient training responses, and therefore the test response should be afforded a low proficient score.

At 690, the similarity scores (i.e., pos_1, pos_2, and pos_3) are compared and the proficiency level associated with the highest similarity score is used as one measure of the content correctness of the test response. Conceptually, this means that the test response should be assigned the proficiency level associated with the training responses that are most similar to it. For example, if pos_2>pos_3>pos_1, then pos_2's associated proficiency level (i.e., proficiency level 2 or medium proficiency) may be a suitable proficiency level for the test response. The proficiency level associated with the highest similarity score will be referred to as pos_score.

Figure 7:
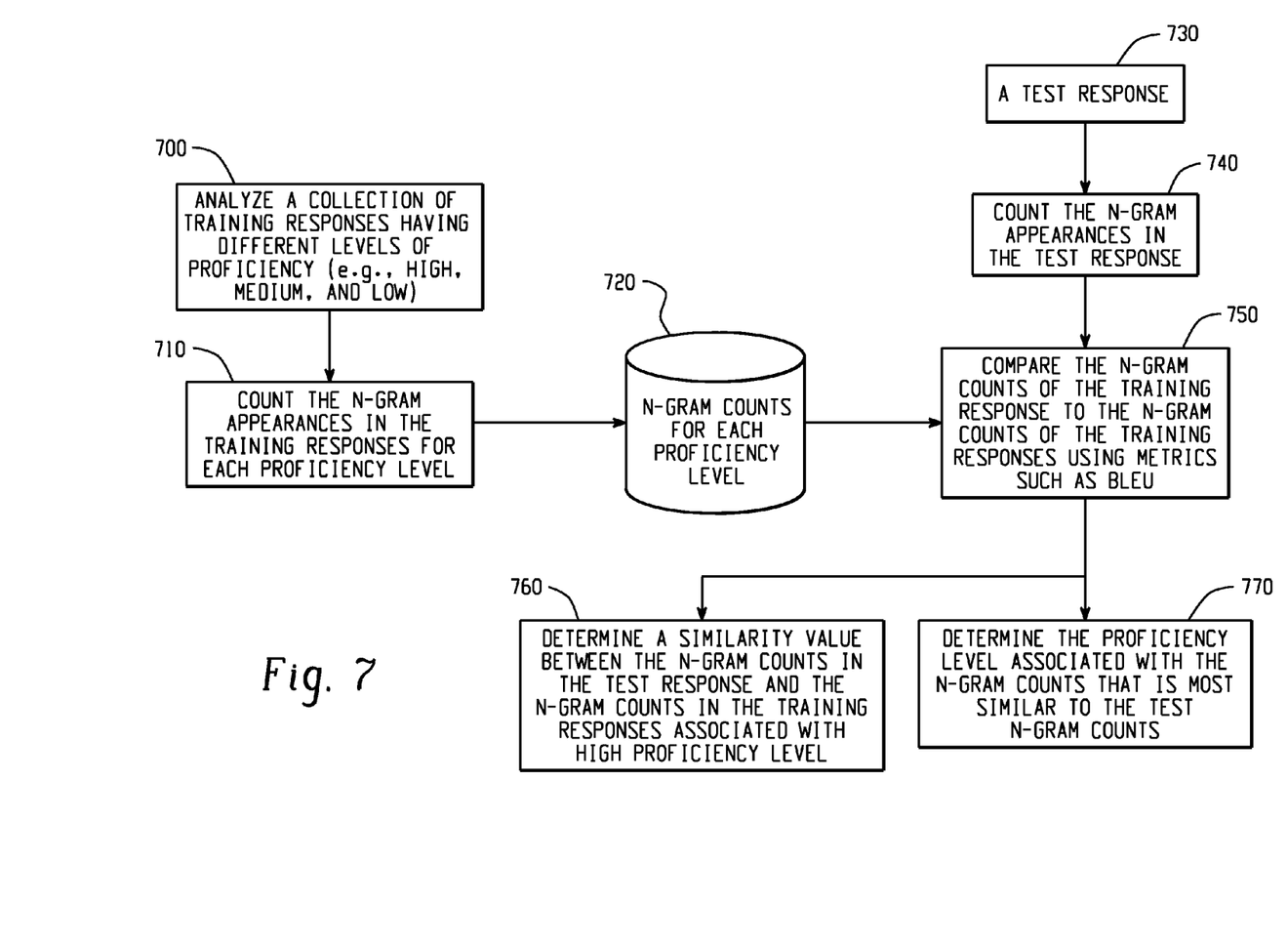
FIG. 7 is a flow diagram depicting a method of matching n-gram models to analyze a response.

FIG. 7 depicts an embodiment using n-gram matching, which are commonly used by BLEU, ROUGE, NIST, TERP, and other machine translation or text summarization evaluation metrics. At 700, a set of training responses with varying degrees of proficiency scores is analyzed. At 710, the n-gram appearances in the training responses for each proficiency level are counted. At 720, the n-gram count for each proficiency level is stored in a repository.

Then at 730, a test response is received or retrieved. At 740, the n-gram appearances in the test response are counted. At 750, the n-gram count for the test response is compared with the n-gram counts for each proficiency level using metrics such as BLEU. The resulting BLEU comparison scores associated with the n-gram counts of the high-proficient group, medium-proficient group, and low-proficient group will be referred to as bleu_3, bleu_2, and bleu_1, respectively. At 760, the BLEU score for the high-proficient group (i.e., bleu_3) is used as one measure of the content correctness of the test response. The higher the BLEU score, the more similar the test response is to the high-proficient training responses. At 770, the BLEU scores for the different proficiency level groups are compared and the proficiency level associated with the highest BLEU score is used as a measure of the content correctness of the test response. Conceptually, this means that the test response should be assigned the proficiency level associated with the training responses that are most similar to it. For example, if bleu_1>bleu_3>bleu_2, then bleu_1's associated proficiency level (i.e., proficiency level 1 or low proficiency) may be a suitable proficiency level for the test response. The proficiency level associated with the highest BLEU score will be referred to as bleu_score.

Figure 8:
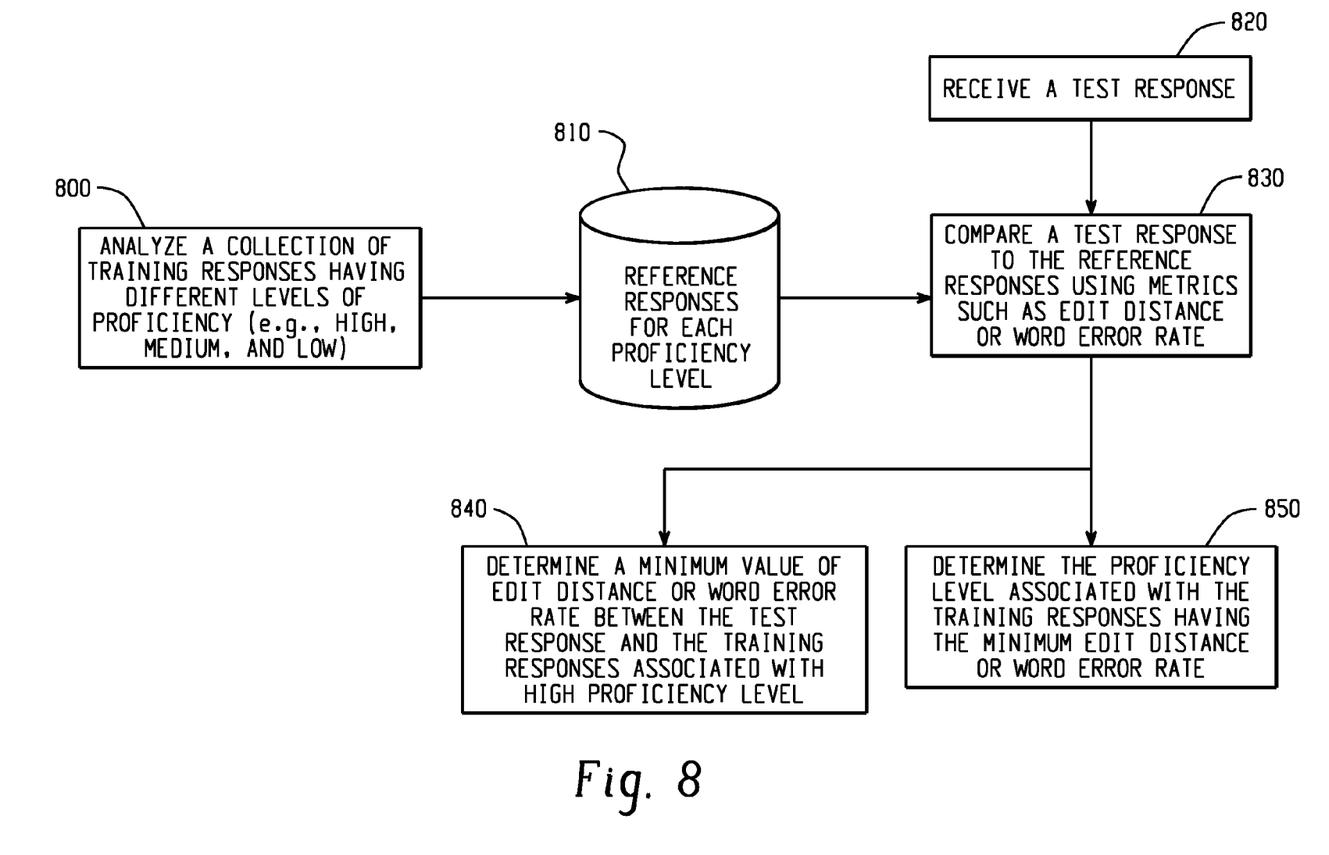
FIG. 8 is a flow diagram depicting a method of using edit distances to analyze a response.

FIG. 8 depicts an embodiment using edit distance or word error rate. Edit distance measures the difference between two word sequences, including insertions, deletions, and substitutions. Word error rate is a normalized value of the edit distance. Both of these metrics quantify the difference between two references.

At 800 a set of training responses with varying degrees of proficiency scores is analyzed and stored in a repository at 810. At 820, a test response is received or retrieved. At 830, the test response is compared with the training responses using a dissimilarity metric, such as edit distance or word error rate, so that a dissimilarity value is computed for each training response. Within each proficiency level, a representative dissimilarity value is determined based on the dissimilarity values associated with the training responses having that proficiency level. In one embodiment, the minimum dissimilarity value within each proficiency level is selected as the representative dissimilarity value for that proficiency level. In an embodiment where edit distance is used, the resulting representative edit distance for the high-proficient group, medium-proficient group, and low-proficient group will be referred to as ed_3, ed_2, and ed_1, respectively. Similarly, the representative word error rates will be referred to as wer_3, wer_2, and wer_1.

At 840, the representative edit distance or word error rate for the high-proficient group (i.e., ed_3 or wer_3) is used as one measure of the content correctness of the test response. For example, the lower the edit distance, the more similar the test response is to the highly proficient training responses, which in turn suggests that the test response should similarly be afforded a high proficient score.

At 850, the representative edit distances or word error rates of the different proficiency groups are compared and the proficiency level associated with the lowest representative edit distance or word error rate is used to measure the content correctness of the test response. Conceptually, this means that the test response should be assigned the proficiency level associated with the training responses that are most similar to it (i.e., requiring the least edits). For example, if ed_3<ed_1<ed_2, then ed_3's associated proficiency level (i.e., proficiency level 3 or high proficiency) may be a suitable proficiency level for the test response. The proficiency level associated with the lowest edit distance will be referred to as ed_score. Similarly, the proficiency level associated with the lowest word error rate will be referred to as wer_score.

Based on one or more of the feature extraction models described above, a scoring model may be designed to automatically score the content correctness of a test response. In one embodiment, re_match, num_fragments, percent_sub_keywords, ed_score, wer_3, and wer_score are used. The scoring model may also take into consideration features related to the delivery of the test response—such as pronunciation, prosody, and fluency—to provide an overall score based on both the test response's content correctness and delivery. Based on empirical studies, the correlation of the automatically generated score based on both content correctness and delivery is greatly improved over a scoring model that is based on measures of delivery alone.

Figure 9A:
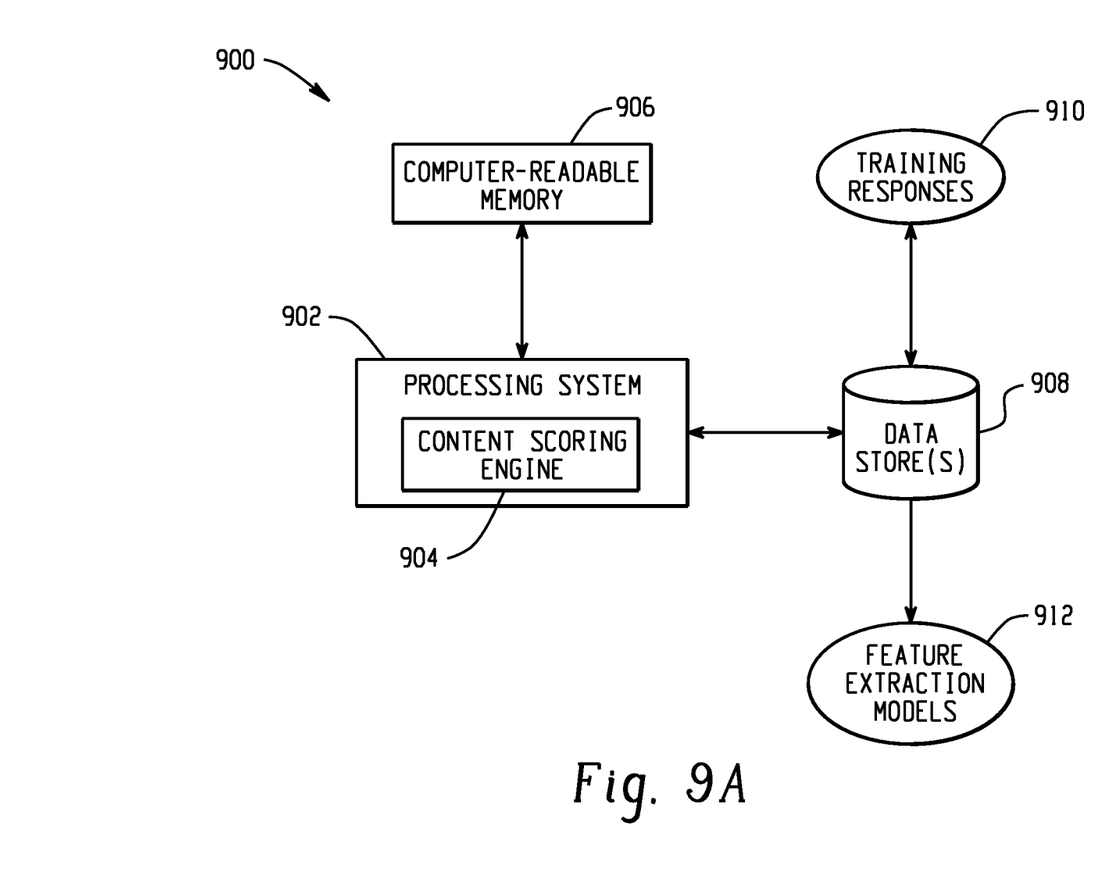
FIGS. 9A, 9B, and 9C depict example systems for implementing a content scoring engine.
Figure 9B:
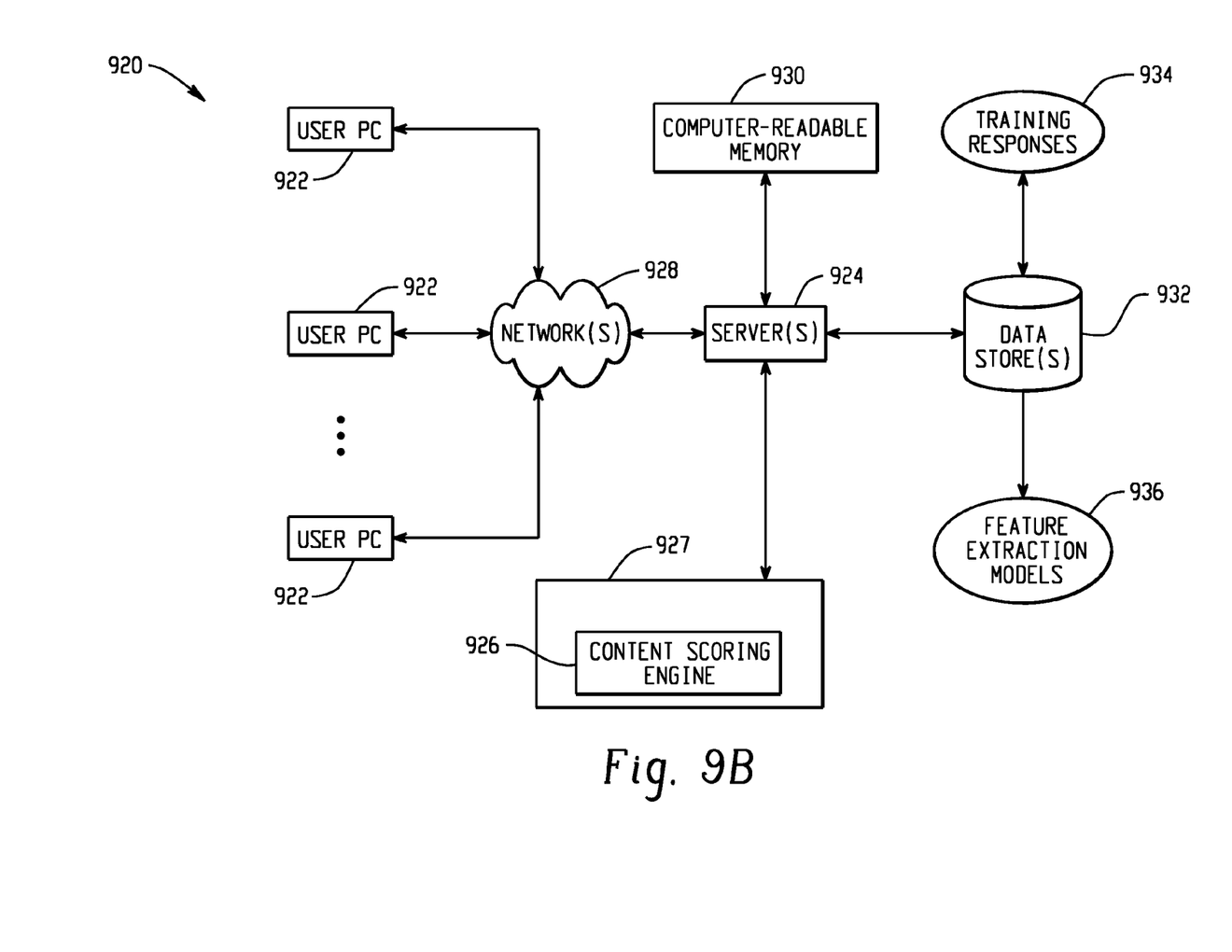
Figure 9C:
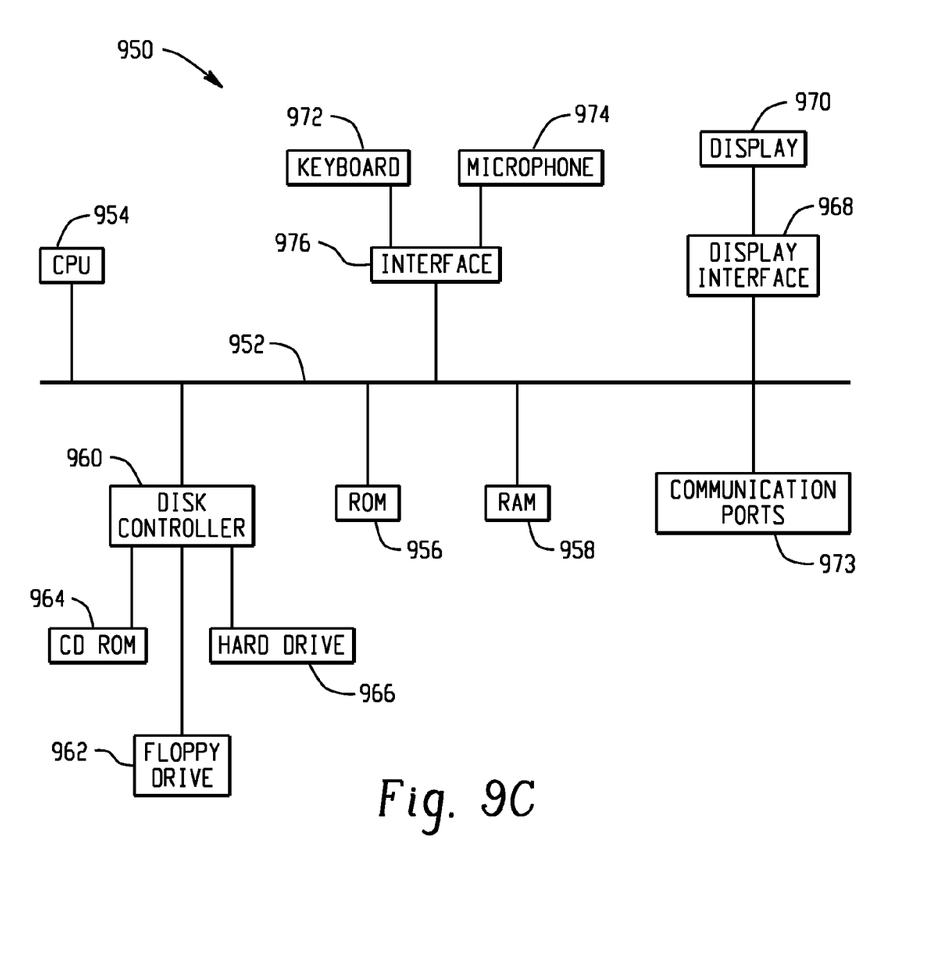

FIGS. 9A, 9B, and 9C depict example systems for use in implementing an automated content scoring engine. For example, FIG. 9A depicts an exemplary system 900 that includes a stand-alone computer architecture where a processing system 902 (e.g., one or more computer processors) includes a content scoring engine 904 (which may be implemented as software). The processing system 902 has access to a computer-readable memory 906 in addition to one or more data stores 908. The one or more data stores 908 may training responses 910 as well as feature extraction models (e.g., regular expressions, POS vectors, etc.) 912.

FIG. 9B depicts a system 920 that includes a client server architecture. One or more user PCs 922 accesses one or more servers 924 running a content scoring engine 926 on a processing system 927 via one or more networks 928. The one or more servers 924 may access a computer readable memory 930 as well as one or more data stores 932. The one or more data stores 932 may training responses 934 as well as feature extraction models 936.

FIG. 9C shows a block diagram of exemplary hardware for a standalone computer architecture 950, such as the architecture depicted in FIG. 9A, that may be used to contain and/or implement the program instructions of exemplary embodiments. A bus 952 may serve as the information highway interconnecting the other illustrated components of the hardware. A processing system 954 labeled CPU (central processing unit) (e.g., one or more computer processors), may perform calculations and logic operations required to execute a program. A computer-readable storage medium, such as read only memory (ROM) 956 and random access memory (RAM) 958, may be in communication with the processing unit 954 and may contain one or more programming instructions for performing the method of implementing a content scoring engine. Optionally, program instructions may be stored on a non-transitory computer readable storage medium such as a magnetic disk, optical disk, recordable memory device, flash memory, RAM, ROM, or other physical storage medium. Computer instructions may also be communicated via a communications signal, or a modulated carrier wave and then stored on a non-transitory computer-readable storage medium.

A disk controller 960 interfaces one or more optional disk drives to the system bus 952. These disk drives may be external or internal floppy disk drives such as 962, external or internal CD-ROM, CD-R, CD-RW or DVD drives such as 964, or external or internal hard drives 966. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 960, the ROM 956 and/or the RAM 958. Preferably, the processor 954 may access each component as required.

A display interface 968 may permit information from the bus 952 to be displayed on a display 970 in audio, graphic, or alphanumeric format. Communication with external devices may optionally occur using various communication ports 973.

In addition to the standard computer-type components, the hardware may also include data input devices, such as a keyboard 972, or other input device 974, such as a microphone, remote control, pointer, mouse and/or joystick.

The invention has been described with reference to particular exemplary embodiments. However, it will be readily apparent to those skilled in the art that it is possible to embody the invention in specific forms other than those of the exemplary embodiments described above. The embodiments are merely illustrative and should not be considered restrictive. The scope of the invention is reflected in the claims, rather than the preceding description, and all variations and equivalents which fall within the range of the claims are intended to be embraced therein.

It is claimed:

1. A computer-implemented method of scoring a response to a prompt, comprising:
receiving an audio recording of the responses;
performing automatic speech recognition of the response to convert the text from a spoken sample to text and one or more acoustic features using automatic speech recognition using an acoustic model;
determining, using a processing system, a first expression similarity feature for the response by applying one or more regular expressions to the response, wherein the one or more regular expressions are determined based on one or more first training responses associated with the prompt;
determining, using the processing system, a second expression similarity feature for the response by applying one or more context free grammars to the response, wherein the one or more context free grammars are determined based on one or more second training responses associated with the prompt;
determining, using the processing system, a third expression similarity feature for the response by applying a keyword list to the response, wherein the keyword list is determined based on the prompt;
determining, using the processing system, a first word usage similarity feature for the response by applying one or more probabilistic n-gram models to the response, wherein each of the one or more probabilistic n-gram models is associated with a proficiency level and is determined based on one or more third training responses associated with the prompt and with that proficiency level;
determining, using the processing system, a second word usage similarity feature for the response by comparing a POS response vector to one or more POS training vectors, wherein the POS response vector is determined based on the response, wherein each of the one or more POS training vectors is associated with a proficiency level and is determined based on one or more fourth training responses associated with the prompt and with that proficiency level;
determining, using the processing system, a third word usage similarity feature for the response by comparing a response n-gram count to one or more training n-gram counts using an n-gram matching evaluation metric, wherein the response n-gram count is determined based on the response, wherein each of the one or more training n-gram counts is associated with a proficiency level and is determined based on one or more fifth training responses associated with the prompt and with that proficiency level;

determining, using the processing system, a dissimilarity feature for the response by comparing the test response to one or more sixth training responses using a dissimilarity metric, wherein each of the one or more sixth training responses is associated with the prompt and with a proficiency level; and automatically determining, using the processing system, a score for the response by using a scoring model to evaluate content correctness of the response based on the first expression similarity feature, the second expression similarity feature, the third expression similarity feature, the first word usage similarity feature, the second word usage similarity feature, the third word usage similarity feature, and the dissimilarity feature of the response, wherein the score is displayed on a graphical user interface;

wherein the scoring model is trained based on predetermined analytic content correctness scores assigned to a plurality of training responses and a set of features extracted from the plurality of training responses, the set of features comprising: the first expression similarity features, the second expression similarity features, third expression similarity feature, the first word usage similarity feature, the second word usage similarity feature, the third word usage similarity feature, and the dissimilarity feature.

2. The method of claim 1, wherein determining the score for the response is further based on one or more delivery metrics applied to the response.

3. The method of claim 2, wherein each of the one or more delivery metrics measures a delivery feature of the response selected from the group consisting of: pronunciation, prosody, and fluency.

4. The method of claim 1,
wherein the first expression similarity feature includes a regular expression matching value, wherein the regular expression matching value is inclusively between a first value indicating no match and a second value indicating exact match;
wherein determining the score for the response includes using the regular expression matching value.

5. The method of claim 1,
wherein the first expression similarity feature includes a regular expression matching value, wherein each of the one or more regular expressions corresponds to a fragment of the one or more first training responses, wherein the regular expression matching value is based on a number of the one or more regular expressions matching the response;
wherein determining the score for the response includes using the regular expression matching value.

6. The method of claim 1,
wherein the second expression similarity feature includes a context free grammar matching value, wherein each of the one or more context free grammars is associated with a fragment in the one or more second training responses, wherein the context free grammar matching value is based on a number of the one or more context free grammars matching the response;
wherein determining the score for the response includes using the context free grammar matching value.

7. The method of claim 1,
wherein the third expression similarity feature includes a keyword matching value, wherein the keyword matching value is based on a number of keywords in the keyword list identified in the response;
wherein determining the score for the response includes using the keyword matching value.

8. The method of claim 1,
wherein the first word usage similarity feature includes a probability based on applying a probabilistic n-gram model associated with a high proficiency level to the response;
wherein determining the score for the response includes using the probability.

9. The method of claim 1, further comprising:
determining a probability value associated with each of the one or more probabilistic n-gram models based on the step of applying the one or more probabilistic n-gram models to the response; and
identifying a highest probability value by comparing the probability values associated with the one or more probabilistic n-gram models;
wherein the first word usage similarity feature includes a proficiency value based on the proficiency level associated with the probabilistic n-gram model that is associated with the highest probability value;
wherein determining the score for the response includes using the proficiency value.

10. The method of claim 1, further comprising:
assigning POS tags to the one or more fourth training responses;
determining each of the one or more POS training vectors using sequences of the POS tags of the one or more fourth training responses associated with the same proficiency level as that of the POS training vector;
assigning POS tags to the response; and
determining the POS response vector using sequences of the POS tags of the response.

11. The method of claim 1,
wherein the second word usage similarity feature includes a POS similarity value based on comparing the POS response vector to a POS training vector associated with a high proficiency level;
wherein determining the score for the response includes using the POS similarity value.

12. The method of claim 1,
wherein the second word usage similarity feature includes a POS proficiency value based on the step of comparing the POS response vector to the one or more POS training vectors, wherein the POS proficiency value is based on a proficiency level associated with one of the one or more POS training vectors that is most comparable to the POS response vector;
wherein determining the score for the response includes using the POS proficiency value.

13. The method of claim 1, wherein the n-gram matching evaluation metric is BLEU.

14. The method of claim 1, wherein the n-gram matching evaluation metric is ROUGE.

15. The method of claim 1, further comprising:
determining the response n-gram count by counting n-gram appearances in the response; and
determining each of the one or more training n-gram counts by counting n-gram appearances in the one or more fifth training responses associated with the same proficiency level as that of the training n-gram count.

16. The method of claim 1,
wherein the third word usage similarity feature includes an n-gram matching value based on comparing the response n-gram count to a training n-gram counts associated with a high proficiency level;
wherein determining the score for the response includes using the n-gram matching value.

17. The method of claim 1, further comprising:
determining an n-gram matching value associated with each of the one or more training n-gram counts based on the step of comparing the response n-gram count to the one or more training n-gram counts using the n-gram matching evaluation metric; and
identifying a highest n-gram matching value by comparing the n-gram matching values associated with the one or more training n-gram counts;
wherein the third word usage similarity feature includes an n-gram matching proficiency value based on the proficiency level associated with the training n-gram count that is associated with the highest n-gram matching value;
wherein determining the score for the response includes using the n-gram matching proficiency value.

18. The method of claim 1, wherein the dissimilarity metric is edit distance.

19. The method of claim 1, wherein the dissimilarity metric is word error rate.

20. The method of claim 1,
wherein the dissimilarity feature includes a dissimilarity value based on comparing the test response to a subset of the one or more sixth training responses using the dissimilarity metric, wherein the subset includes training responses associated with a high proficiency level;
wherein determining the score for the response includes using the dissimilarity value.

21. The method of claim 1, further comprising:
determining a dissimilarity value associated with each of one or more subsets of the one or more sixth training responses using the dissimilarity metric, wherein each of the one or more subsets is associated with a proficiency level and includes training responses associated with that proficiency level; and
identifying a lowest dissimilarity value by comparing the dissimilarity values associated with the one or more subsets;
wherein the dissimilarity feature includes a dissimilarity proficiency value based on the proficiency level associated with the subset that is associated with the lowest dissimilarity value;
wherein determining the score for the response includes using the dissimilarity proficiency value.

* * * * *